United States Patent
Dorai et al.

(10) Patent No.: US 7,761,401 B2
(45) Date of Patent: Jul. 20, 2010

(54) STOCHASTIC CONTROL OPTIMIZATION FOR SENDER-BASED FLOW CONTROL IN A DISTRIBUTED STATEFUL MESSAGING SYSTEM

(75) Inventors: Chitra Dorai, Chappaqua, NY (US); Jeong-Hyon Hwang, East Providence, RI (US); Robert Evan Strom, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 11/759,639

(22) Filed: Jun. 7, 2007

(65) Prior Publication Data

US 2008/0306888 A1    Dec. 11, 2008

(51) Int. Cl.
G06F 15/18    (2006.01)
(52) U.S. Cl. ............. 706/62; 706/45; 709/204; 709/205; 709/206; 709/207; 709/217
(58) Field of Classification Search ........... 706/45, 706/50, 62; 709/203–207, 217
See application file for complete search history.

(56) References Cited

U.S. PATENT DOCUMENTS 7,392,279 B1 * 6/2008 Chandran et al. ............. 709/200
2003/0135556 A1 * 7/2003 Holdsworth ............. 709/206
2004/0224706 A1 * 11/2004 Lorello et al. ............. 455/466
2005/0129032 A1 * 6/2005 Kim et al. ............. 370/400
2005/0251556 A1 * 11/2005 Ginis et al. ............. 709/206
2005/0251811 A1 * 11/2005 Ginis et al. ............. 719/313
2005/0268146 A1 * 12/2005 Jin et al. ............. 714/2
2007/0156656 A1 * 7/2007 Pather et al. ............. 707/3

OTHER PUBLICATIONS

U.S. Appl. No. 11/475,708, filed Jun. 27, 2006, Strom.

* cited by examiner

*Primary Examiner*—Donald Sparks
*Assistant Examiner*—Omar F Fernandez Rivas
(74) *Attorney, Agent, or Firm*—Yee & Associates, P.C.; Stephen C. Kaufman (57) ABSTRACT

A method and system for controlling message flow in distributed stream processing. State transition probabilities in a Markov model having one state per staleness value of data are determined for sending or withholding updates of data to subscribers using expected message rates from an information provider. A cost function annotates each state transition in the model with a state transition cost for each decision to "send" or "withhold". A propagation policy specifying whether to send or withhold the message is determined for each state. The propagation policy is then deployed. If a new message comprising an update of data is received during a lapsed time unit, a staleness value of the data held by subscribers is increased. The propagation policy is used to determine whether to send or withhold the message. If the message should be sent, the message is propagated and the staleness value of the data is reset.

18 Claims, 3 Drawing Sheets

STOCHASTIC CONTROL OPTIMIZATION FOR SENDER-BASED FLOW CONTROL IN A DISTRIBUTED STATEFUL MESSAGING SYSTEM

BACKGROUND OF THE INVENTION

1. Field of the Invention

The present invention relates generally to an improved data processing system, and in particular to a computer implemented method, data processing system, and computer program product for finding an optimal policy for controlling message flow in distributed stream processing.

2. Description of the Related Art

Information dissemination systems provide a wide class of information services over a distributed network. An example of an information dissemination system is a stateful publish-subscribe system. In such a system, a number of service providers continuously deliver information of interest to a variety of service subscribers. Examples of such information services include real-time stock quotes, intelligent routing based on road traffic, news delivery, surveillance, etc. Each service provider in such a system typically maintains a large set of data items and propagates updates on those data items to service subscribers in a timely manner.

A problem encountered with existing information dissemination systems is in determining how frequently to propagate updates between servers in a distributed system, or between a server and a service subscriber. Although propagating updates immediately after the update occurs increases the timeliness of the data on the subscriber-side, propagating an update requires using system resources, such as bandwidth within the communication network between service providers and subscribers. Extreme strategies of propagating updates include (1) propagating every update—which guarantees the timeliest delivery but may produce excessive message traffic, and (2) withholding updates indefinitely—which minimizes message traffic, but prevents subscribers from obtaining timely information. Thus, updates can be sent either more frequently, thereby providing increased timeliness of data but at a cost of greater system utilization, or less frequently, with less timeliness but better system utilization. Furthermore, the cost of updates can have multiple components. For example, while there is a direct system cost per message sent, there may also be an indirect cost since more messages means more congestion, and eventually more delay.

SUMMARY OF THE INVENTION

The illustrative embodiments provide a computer implemented method, data processing system, and computer program product for finding an optimal flow control policy in distributed stream processing. The illustrative embodiments identify a Markov model having one state per staleness value of data. State transition probabilities in the Markov model are determined for a decision to send a new message comprising updates of data to information subscribers and for a decision to withhold the new message from the information subscribers using expected message rates from an information provider. A cost function is used to annotate each state transition in the Markov model with a state transition cost for the decision to send the new message and the decision to withhold the new message. A propagation policy which specifies whether to send the new message to the information subscribers or to withhold the new message from information subscribers is determined for each state. The propagation policy is then deployed.

The illustrative embodiments also control message flow by determining whether a new message comprising an update of data was received from an information provider during a lapsed time unit. If a new message was received during the time unit, a staleness value of data held by information subscribers and associated with the new message is increased. The propagation policy is used to determine whether to send or withhold the new message to the information subscribers. If a determination is made to send the new message, the new message is propagated toward the information subscribers and the staleness value of the data held by the information subscribers and associated with the new message is reset.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The illustrative embodiments provide a computer implemented method, data processing system, and computer program product for determining an optimal flow control policy in distributed stream processing. The solution provided by the illustrative embodiments may be advantageous in situations where sending every information update to subscribers may result in overly using the system resources, such as CPUs and the communication network, and wherein withholding some updates does not seriously damage the timeliness of information processing. Stochastic control theory is used to compute the optimal control policy for selectively sending updates so that subscribers may receive the most up-to-date information relative to the use of system resources and subscribers' interest on different data items.

The information dissemination environment (hereinafter, the "system") in the illustrative embodiments comprises a number of information providers which deliver events into the system, and computation nodes which maintain a state consisting of a set of data items (such as a table of stock prices and volumes) and selectively propagate updates on those data items to other computation nodes or to service subscribers. These subscribers submit objective data to the system describing how the quality of service decreases in each subscriber's perspective when a subscriber does not receive upto-date information. As commonly observed from real data, each data item may have a different update rate and a different impact on the overall service quality of the system.

Within the illustrative embodiments, a metric called "staleness" is defined as the primary metric for quality of service. If an information provider withholds an update on a data item, the value of the data item on the provider-side will no longer be the same as the value on the subscriber-side. In this situation, the subscribers will have stale data. Thus, the term "staleness" refers to how stale the subscriber-side data is in comparison to an ideal case in which updates are sent instantaneously. For example, the staleness of data is zero if a subscriber has an up-to-date value of a data item; otherwise, staleness is the number of ticks (time increments) that have passed since that up-to-date value was computed by the information provider.

Based on the objective quality of service descriptions provided by the subscribers, each information provider creates a utility function that captures the desired tradeoff between message traffic and information staleness. The utility functions first split a time period into time increments called "ticks". The utility functions then compute a state transition cost per tick based upon (1) whether an update for a data item was delivered to subscribers during that tick, and (2) the staleness of the data at that tick. To compute the state transition cost, the information provider creates a Markov model which contains parameters that define the evolution of staleness as a function of: (1) the current staleness, (2) the probability that a new message will arrive during the current tick, and (3) the decision whether or not to send the latest message during the current tick. Each state transition within this Markov model is labeled with a cost which is a user-determined weighted combination of (1) the cost of propagating an update on the data item to the subscribers, and of (2) the penalty of the subscribers having stale data. Given a utility function and the parameters of the Markov model, the system manager then executes an algorithm based upon stochastic control theory to compute a control or propagation policy for each computation node that may send update messages and deploys this policy to the specific computation node. That node makes a determination at each tick, based upon the current staleness and the pre-computed propagation policy, whether to deliver the updated value of a data item or whether to delay sending the update. This determination to deliver or withhold is made to optimize the average state transition cost per tick with respect to the supplied utility function.

Figure 1:
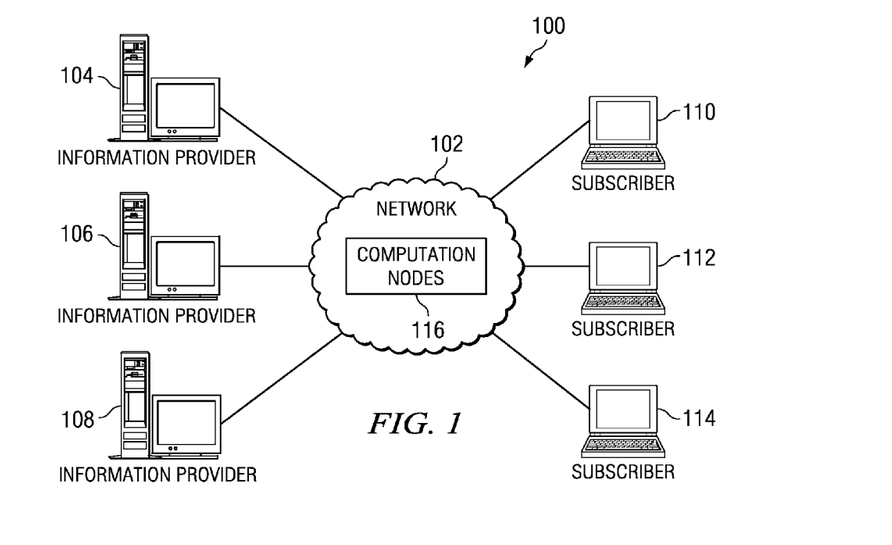
FIG. 1 depicts a pictorial representation of an information dissemination system in which the illustrative embodiments may be implemented.
Figure 2:
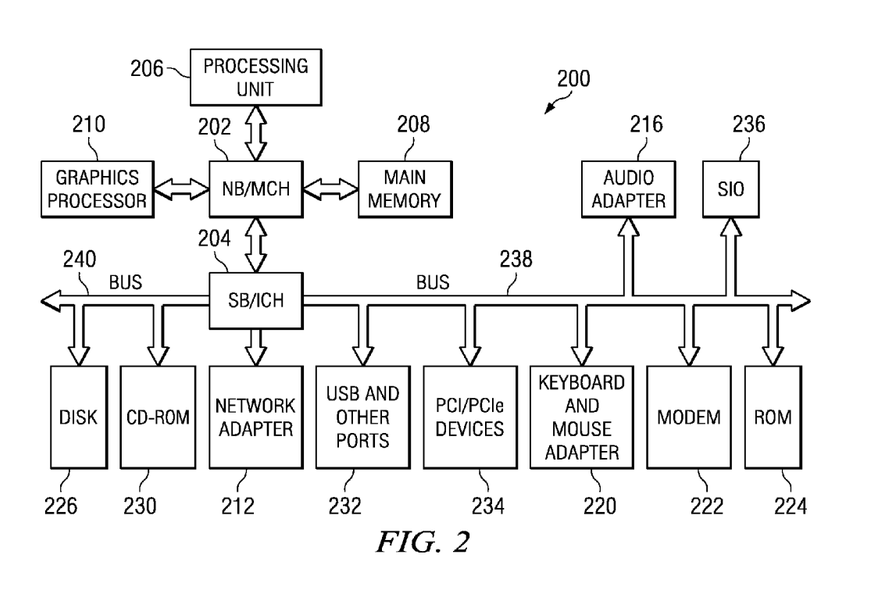
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of an information dissemination system in which illustrative embodiments may be implemented. Information dissemination system 100 is a network of computers in which the illustrative embodiments may be implemented. Information dissemination system 100 contains network 102, which is the medium used to provide communications links between various devices and computers connected together within information dissemination system 100. Network 102 may include connections, such as wire, wireless communication links, or fiber optic cables.

In the depicted example, information providers 104, 106, and 108 connect to network 102. In addition, subscribers 110, 112, and 114 connect to network 102. Subscribers 110, 112, and 114 may be, for example, personal computers, network computers, telephone devices, and the like. Network 102 contains computation nodes 116 implemented within the computers of information dissemination system 100. Computation nodes 116 are intermediaries between information providers 104, 106, and 108 and subscribers 110, 112, and 114. For instance, the information providers may be supplying stock trade events. Computation nodes 116 may compute data based on the history of stock trades, e.g. the average selling price, or the total traded volume. Subscribers 110, 112, and 114 subscribe to this data, which can be sent on or withheld. Information providers 104, 106, and 108 typically maintain a large set of data items and propagate updates on these data items to subscribers 110, 112, and 114 in a timely manner. For example, information provider 104 may provide information of interest, such as real-time stock quotes, intelligent routing based on road traffic, news delivery, surveillance, etc., to subscribers 110, 112, and 114. Within the system, there may be computational nodes 116. Computational nodes 116 take the information supplied by the information providers 104, 106, and 108 and aggregate, filter, or otherwise process it into information of interest to subscribing clients. For example, in a stock trading system, information providers 104, 106, and 108 may be supplying raw stock quotes and the computational node 116 may be computing the aggregate shares sold grouped by issue. Subscribers 110, 112, and 114 are subscribers to computational node 116 in this example. Network data processing system 100 may include additional information providers, subscribers, computational nodes, and other devices not shown.

Information dissemination system 100 may be the Internet with network 102 representing a worldwide collection of networks and gateways between computers that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, information dissemination system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as information provider 104 or subscriber 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Staleness Defined

Figure 3:
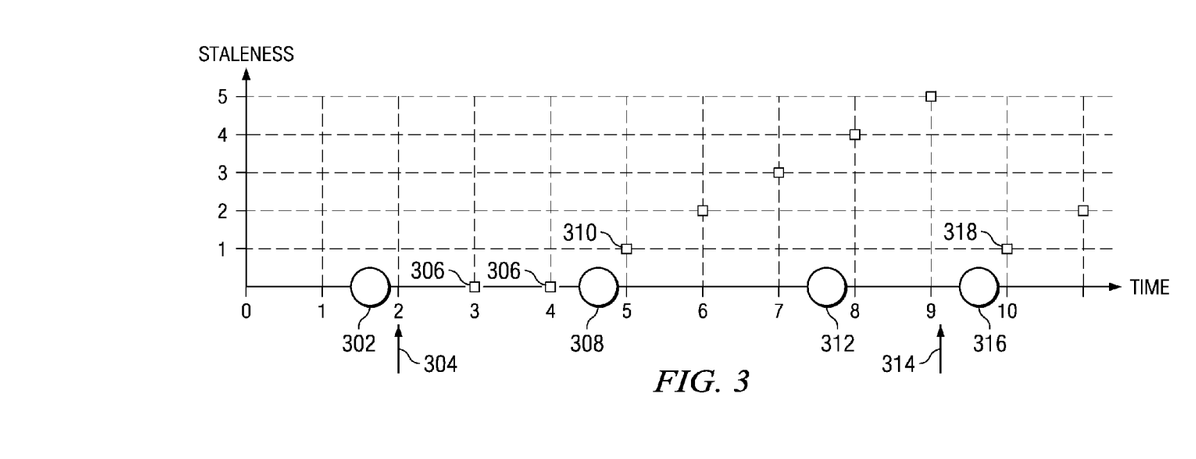
FIG. 3 is a graph which illustrates how staleness of a data item changes based on the delivery or non-delivery of updates to a subscriber in accordance with the illustrative embodiments.

As previously mentioned, "staleness" of a data item describes how up-to-date a subscriber's data is in comparison to the computational node's data. FIG. 3 is a graph which illustrates how staleness of a data item changes based on the delivery or non-delivery of updates to a subscriber in accordance with the illustrative embodiments. In particular, FIG. 3 illustrates how the data item on the subscriber-side may enter a different state depending on the actions taken at the previous state.

In this illustrative example, a computational node at time 2 observes a new data item 302. The node immediately delivers data item 302 to the subscribers (arrow 304 at time 2). As the subscribers now have up-to-date data, the staleness is maintained at 0, as shown by blocks 306 at time 3 and time 4, until an update (data item 308) occurs before time 5. If the node withholds the update, the subscriber-side data becomes stale. In this case, because the subscriber-side data was up-to-date until time 4, the data at time 5 is 1 time unit stale, as shown by block 310.

In this example, the staleness of the data item increases as time passes. A subsequent update 312 of the data item at time 8 does not affect the staleness unless update 312 is delivered to the subscribers. At time 9, the node delivers (arrow 314 at time 9) the most recent update to the subscribers (i.e., data item 312 observed by the provider at time 8), and the subscribers now have the up-to-date data. However, if another update 316 occurs right after the previous update was delivered (i.e., at time 10), the subscribers will again have stale data, as shown by block 318.

Based on the observations in FIG. 3, the staleness $i_d(t)$ of data item d at time t (in the subscribers' perspective) may be defined as $$i_d(t) = \begin{cases} 0 & \text{if } d \text{ is up-to-date at time } t \\ t - t'(d), & \text{otherwise} \end{cases}$$

where t'(d) is the last time when d was up-to-date.

State Transition and State Transition Cost

FIG. 3 illustrated how states of data items are defined in terms of staleness of the subscriber-side data, and how the subscriber-side data may enter a different state depending on the actions taken at the previous state. These actions taken incur a cost of delivering an update on a data item to subscribers. This cost is known as the state transition cost. The state transition cost may include two types of costs: (1) update propagation cost $\alpha_d$ and (2) the staleness penalty $s_d(i)$. The update propagation cost is the resource utilization cost of delivering an update of a data item to subscribers. The staleness penalty expresses the dissatisfaction of subscribers having a stale value (time unit stale value i) for the data item. When data item d is i time unit stale, taking the action of sending the most recent update to subscribers involves the update propagation cost $\alpha_d$. This action does not incur any cost with respect to staleness, since the subscribers will obtain up-to-date information. In contrast, taking the action of withholding the update does not incur the cost of update propagation $\alpha_d$. However, withholding the update allows the staleness penalty $s_d(i)$ to increase. Therefore, the state transition cost $g_d(i,u)$ of taking an action u for data item d (assuming that d is i time unit stale) may be defined as $$g_d(i, u) = \begin{cases} \alpha_d & \text{if } u = \text{'send'} \\ s_d(i), & \text{otherwise.} \end{cases}$$

Figure 4:
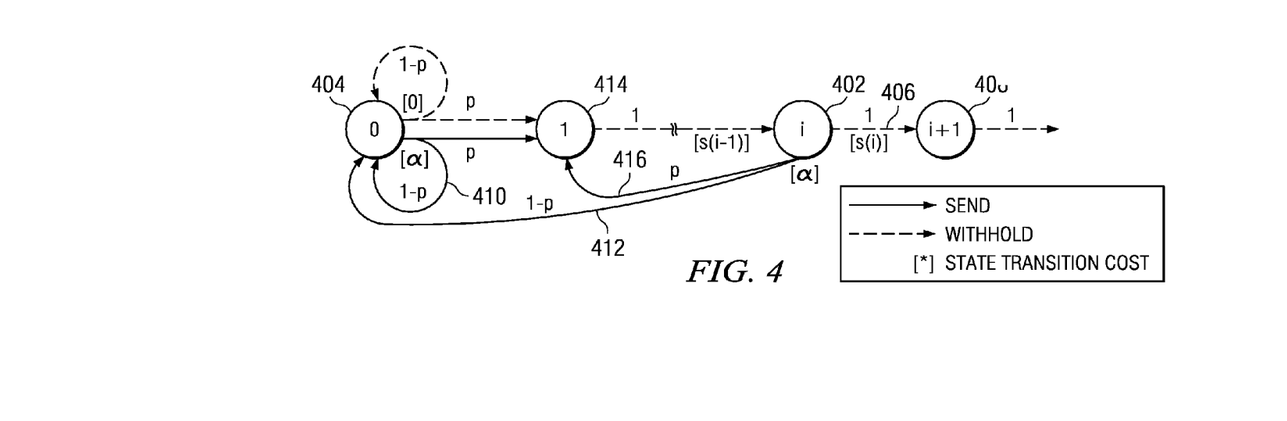
FIG. 4 is a diagram illustrating the state transition and state transition cost using a Markov model in accordance with the illustrative embodiments.

FIG. 4 is a diagram illustrating the state transition and state transition cost in accordance with the illustrative embodiments. In particular, FIG. 4 is a Markov model which summarizes the relationships between update, staleness, and the actions that are taken (i.e., send and/or withhold) in terms of states and transitions between them. State i 402 represents the state that a data item is i time unit stale. State 0 404 implies that the data item is up-to-date in the subscribers' perspective.

When the subscriber-side data is i time units stale (i>0), the staleness of the data item increases by 1 time unit at the next time tick, unless the computational node delivers the most recent update to subscribers. This situation is represented in this illustrative example as withhold arrow 406 that moves from state i 402 to state i+1 408. In contrast, if the provider sends the update, the staleness of the subscriber-side data immediately falls down to state 0 404, as shown by send arrows 410 and 412. However, the staleness of the data can be either at state 1 414 or at state 0 404 at the next time tick, depending on whether or not an update occurs and is delivered. In this figure, p denotes the probability that the provider observes an update until the next time tick, and arrow 416 from state i 402 to state 1 414 represents the situation where update propagation is superseded by an update that immediately followed (note that this arrow is associated with probability p). This situation corresponds to the situation in FIG. 3 of having staleness of 1 at time 10. FIG. 4 also shows that sending out an update (arrows 410 and 412) leads to staleness of 0 with probability of 1-p.

As previously mentioned, the illustrative embodiments strike a balance between resource utilization and the timeliness of the information delivered to the subscribers. To achieve this goal, the illustrative embodiments minimize the state transition cost function that combines (1) the cost $\alpha_d$ of delivering an update on data item d to subscribers, and (2) the penalty $s_d(i)$ of subscribers having i time unit stale value for data item d. For the cost $\alpha_d$ of delivering an update on data item d to subscribers, a fixed cost for each data item may be used to simplify the problem, but this condition may be relaxed to cope with varying system conditions. For the penalty $s_d(i)$ of subscribers having i time unit stale value for data item d, two types of penalty are considered, each one defined as a function of staleness.

One type of staleness penalty is the linear penalty function of staleness. In this case, it is assumed that the subscribers' dissatisfaction increases in proportion to the staleness of information. This type of penalty as a linear function of staleness is as follows:

$$s_d(i) = \beta_d \cdot i$$

where i is the staleness of data item d and $\beta_d$ represents the negative effect of the staleness with respect to the overall quality of service.

Another type of staleness penalty takes the form of a logistic function. This logistic model is used to describe time-critical situations where the subscribers assume staleness beyond a certain point as failure of service. For example, if subscribers are completely unsatisfied with 1-second stale information, any staleness longer than 1 second has the same effect of losing all the subscribers. This type of penalty as a logistic function of staleness is as follows:

$$s_d(i) = M_d \frac{1 + m_d e^{-i/\tau_d}}{1 + n_d e^{-i/\tau_d}}$$

where i is the staleness of data item d, and where $M_d$, $\tau_d$, $m_d$, and $n_d$, are constants specific to data item d.

Control Policy

Given the state transition probabilities and state transition costs as described in FIG. 4, an optimal control policy is identified which minimizes the state transition cost $g_d(i,u)$ in the average sense. The control policy is used to determine at each tick whether to deliver or withhold information, thereby optimally balancing resource utilization and the timeliness of delivered information.

One possible way of finding the best control policy is to use Bellman's equation. Bellman's equation is an optimality equation developed by Richard Bellman which allows for determining an optimal policy. Bellman's equation is expressed in the following form:

For each state i (1≦i≦n), $$\lambda * + h*(i) = \min_{action\ u} \left[ g(i,u) + \sum_{j=1}^{n} p_{ij}(u) h*(j) \right],$$

where g(i,u) is the cost of taking action u at state i and $p_{ij}(u)$ is the probability of moving from state i to state j when action u is taken at state i.

Notice that $\lambda *$ and $h*(i)$ are unknowns in the equation and there are iterative methods that find the values for them as well as the action u for each state i that minimizes the right-hand side of the equation. This implies that solving the equation results in knowing the best action to be taken for each situation (i.e., the optimal control policy is found). However, given n states, this method requires solving an equation system of 1+n unknowns.

A more economical solution to finding an optimal control policy is to assume a canonical control policy and find that the average state transition cost may be represented as a function of the policy. Then, the control policy which minimizes the average state transition cost may be found.

Consider a situation in which an optimal control strategy has decided to deliver the most recent update to subscribers when the staleness of data item d has reached θ in time units. As the optimality of the control strategy guarantees that the benefit of that delivery action must have been greater than the state transition cost of that action, it is evident that for all staleness beyond θ the control strategy will decide to deliver the update (because the benefit of update propagation never decreases as the staleness increases while the cost remains stationary). Therefore, the optimal policies will be of the following canonical form:

If staleness i≧θ, then

Send the most recent update

It should be noted that the control policy is parameterized by θ only. This parameterization implies that the problem of finding the optimal policy is now reduced to finding the optimal threshold θ* for the canonical control policy.

The following theorem illustrates how the average state transition cost for such canonical policies may be computed. Given a canonical control strategy parameterized by staleness threshold θ and a staleness penalty function $s_d(i)$, the average state transition cost of data item d may be represented as:

$$c_d(\theta) = \frac{\sum_{i=1}^{\theta-1} s_d(i) + \alpha_d}{\theta + \lambda_d}$$

where (1) $\alpha_d$ is the cost of propagating an update on data item d, (2) $s_d(i)$ is the penalty of data item d being i time unit stale, and (3)

$$\lambda_d = \frac{1}{p_d} - 1$$

As cost function $c_d(\theta)$ in the theorem is represented as a one-dimensional function of $\theta$, the optimal staleness threshold $\theta^*$ may be found in many practical cases by using one of the well known minimization algorithms. Consequently, the control policy may be found which optimally balances the tradeoff between resource utilization and staleness of information.

In addition, for the linear staleness penalty function and the logistic staleness penalty function previously discussed above, the optimal staleness threshold $\theta$ specific to each penalty function may now be determined. As mentioned above, the linear staleness penalty takes the form of $s_d(i)=\beta_d \cdot i$ Given a canonical control strategy parameterized by staleness threshold $\theta$ and a linear staleness penalty $s_d(i)=\beta_d \cdot i$, the average state transition cost of data item d may be represented as:

$$c_d(\theta) = \frac{1/2\theta(\theta-1)\beta_d + \alpha_d}{\theta + \lambda_d}, \text{ where } \lambda_d = \frac{1}{p_d} - 1$$

Furthermore, the cost function $c_d(\theta)$ is minimized at $$\theta^* = \sqrt{2\frac{\alpha_d}{\beta_d} + \lambda_d^2 + \lambda_d} - \lambda_d$$

The logistic staleness penalty takes the form of $$s_d(i) = M_d \frac{1 + m_d e^{-i/\tau_d}}{1 + n_d e^{-i/\tau_d}}$$

Given a canonical control strategy parameterized by staleness threshold $\theta$ and a logistic staleness penalty $$s_d(i) = M_d \frac{1 + m_d e^{-i/\tau_d}}{1 + n_d e^{-i/\tau_d}},$$

the average state transition cost of data item d may be represented as:

$$c_d(\theta) = \frac{M_d \left[\frac{m_d}{n_d}(\theta-1) + \tau_d\left(1 - \frac{m_d}{n_d}\right) \ln\left(\frac{e^{\frac{\theta-t}{\tau_d}} + n_d}{n_d + 1}\right)\right] + \alpha_d}{\theta + \lambda_d},$$

where $\lambda_d = \frac{1}{p_d} - 1$

Figure 5:
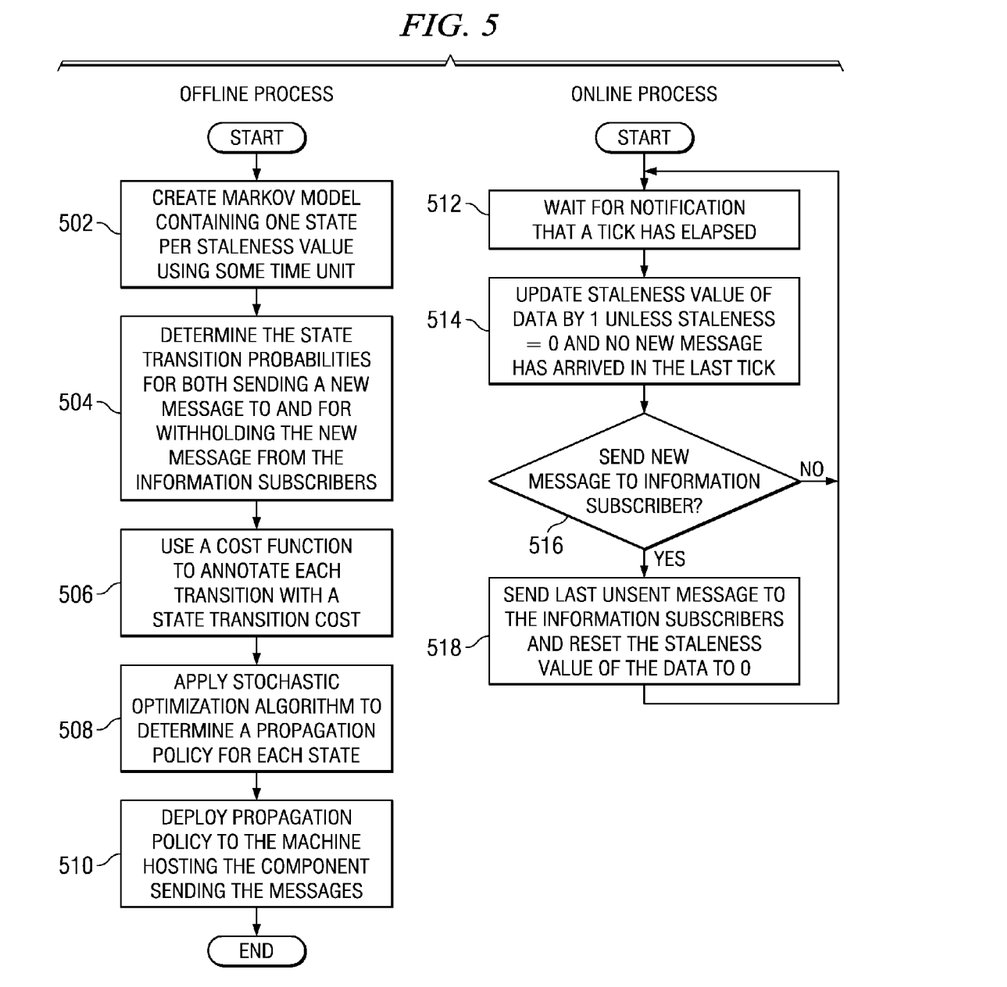
FIG. 5 is a flowchart of an offline process for determining an optimal flow control policy in distributed stream processing in accordance with the illustrative embodiments, and of an online process for executing the policy within the information dissemination system.

FIG. 5 is a flowchart of two processes for determining an optimal flow control policy in distributed stream processing in accordance with the illustrative embodiments. The process described in FIG. 5 may be implemented in a data processing system, such as information dissemination system 100 in FIG. 1. The processes comprise an offline process for determining an optimal flow control policy in distributed stream processing, and an online process for executing the policy within the information dissemination system.

In the offline process, a Markov model is created which contains one state per staleness value, using some time unit (step 502). The information dissemination system uses the expected message rates from the information providers to determine the state transition probabilities in the Markov model for both sending a new message comprising updates of data to information subscribers and for withholding the new message from the information subscribers (step 504). The state transition probabilities are the possible states that the data item may enter depending on the action taken by the information provider at the previous state. The information dissemination system then uses a cost function to annotate each transition in the above Markov model with a state transition cost (step 506). The state transition cost includes the cost of delivering an update of the data item to subscribers (update propagation cost) and the penalty of the subscribers having an i time unit stale value for the data item. The staleness penalty is an objective function which describes the dissatisfaction of subscribers based on the level of staleness of the data item.

A stochastic optimization algorithm is applied to Markov model to determine a propagation policy for each state (step 508). This propagation policy specifies whether the information dissemination system should send the new message to the information subscribers or withhold the new message from information subscribers. The propagation policy is then deployed to the machine hosting the component sending the messages (e.g., computational node) (step 510).

The online process is executed within a "controller" embedded within the message sending layer of the machine that hosts the computational node 116 in FIG. 1 for which control of sending is required. The controller waits for a notification that a tick has elapsed (step 512). If such notification is received, the staleness value of the data is updated by 1, unless the staleness is 0 and no new message has arrived in the last tick (step 514). The controller then observes the staleness of the data, and uses the propagation policy previously deployed during step 510 to determine whether to send the new message to the information subscribers or to withhold the new message from information subscribers (step 516).

If the controller determines to send the new message ('yes' output of step 516), the last unsent message is sent towards the information subscribers and the staleness value of the data is reset to 0 (step 518). The process loops back to step 512 and waits for the next tick.

Turning back to step 516, if the controller determines to withhold the new message ('no' output of step 516), the process loops back to step 512 and waits for the next tick.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating a propagation policy for controlling message flow in an information dissemination environment, the computer implemented method comprising:
   identifying a Markov model having one state per staleness value of data;
   determining state transition probabilities in the Markov model for a decision to send a new message comprising updates of data to information subscribers and for a decision to withhold the new message from the information subscribers using expected message rates from a information provider;
   using a cost function to annotate each state transition in the Markov model with a state transition cost for the decision to send the new message and the decision to withhold the new message;
   determining a propagation policy for each state, wherein the propagation policy specifies whether to send the new message to the information subscribers or to withhold the new message from information subscribers; and
   deploying the propagation policy.

2. The computer implemented method of claim 1, wherein determining a propagation policy for each state includes applying a stochastic optimization algorithm to determine whether to send the new message to the information subscribers or to withhold the new message from information subscribers.

3. The computer implemented method of claim 2, wherein the stochastic optimization algorithm minimizes an average cost per tick over a time period.

4. The computer implemented method of claim 1, wherein the state transition probabilities are derived from estimated or previously observed statistics regarding update rates.

5. The computer implemented method of claim 2, wherein using a cost function to annotate each state transition probability in the Markov model with a state transition cost further comprises:
   computing the state transition cost using a propagation cost of propagating the new message toward the information subscribers and a penalty which is a function of the staleness value for the data.

6. The computer implemented method of claim 1, wherein the Markov model comprises: (a) parameters which define a staleness value as a function of a current staleness, (b) a probability that a new message will arrive during a current time unit, and (c) costs per transition for each value of the decision whether to send or withhold a latest message during the current time unit.

7. A computer implemented method for controlling message flow in distributed stream processing, the computer implemented method comprising:
   responsive to a lapse of a time unit, determining whether a new message comprising an update of data was received from an information provider during the time unit;
   responsive to a determination that a new message was received during the time unit, increasing a staleness value of data held by information subscribers and associated with the new message;
   determining whether to send or withhold the new message to the information subscribers based on a propagation policy; and
   responsive to a determination to send the new message, propagating the new message toward the information subscribers and resetting the staleness value of the data held by the information subscribers and associated with the new message.

8. The computer implemented method of claim 7, wherein the staleness value is a number of time units that have passed since an unsent updated state has been received.

9. The computer implemented method of claim 7, wherein the propagation policy specifies sending the new message if the staleness value is above a threshold, and withholding the new message if the staleness value is below a threshold.

10. A computer program product for generating a propagation policy for controlling message flow in an information dissemination environment, the computer program product comprising:

a non-transitory computer usable medium having computer usable program code tangibly embodied thereon, the computer usable program code comprising:

computer usable program code for identifying a Markov model having one state per staleness value of data;

computer usable program code for determining state transition probabilities in the Markov model for a decision to send a new message comprising updates of data to information subscribers and for a decision to withhold the new message from the information subscribers using expected message rates from a information provider;

computer usable program code for using a cost function to annotate state transitions in the Markov model with a state transition cost for the decision to send the new message and the decision to withhold the new message;

computer usable program code for determining a propagation policy for each state, wherein the propagation policy specifies whether to send the new message to the information subscribers or to withhold the new message from information subscribers; and computer usable program code for deploying the propagation policy.

11. The computer program product of claim 10, wherein the computer usable program code for determining a propagation policy for each state includes applying a stochastic optimization algorithm to determine whether to send to or withhold the new message from information subscribers.

12. The computer program product of claim 11, wherein the stochastic optimization algorithm minimizes an average cost per tick over an indefinite period.

13. The computer program product of claim 10, wherein the state transition probabilities are derived from estimated or previously observed statistics regarding update rates.

14. The computer program product of claim 11, wherein the computer usable program code for using a cost function to annotate each state transition probability in the Markov model with a state transition cost further comprises:

computer usable program code for computing the state transition cost using a propagation cost of propagating the new message toward the information subscribers and a penalty which is a function of the staleness value for the data.

15. The computer program product of claim 10, wherein the Markov model comprises (a) parameters which define a staleness value as a function of a current staleness, (b) a probability that a new message will arrive during a current time unit, and (c) costs per transition for each value of the decision whether to send or withhold a latest message during the current time unit.

16. A computer program product for controlling message flow in distributed stream processing, the computer program product comprising:

a non-transitory computer usable medium having computer usable program code tangibly embodied thereon, the computer usable program code comprising:

computer usable program code for determining, in response to a lapse of a time unit, whether a new message comprising an update of data was received from an information provider during the time unit;

computer usable program code for increasing, in response to a determination that a new message was received during the time unit, a staleness value of data held by information subscribers and associated with the new message;

computer usable program code for determining whether to send or withhold the new message to the information subscribers based on a propagation policy; and computer usable program code for propagating the new message toward the information subscribers and resetting the staleness value of the data held by the information subscribers and associated with the new message in response to a determination to send the new message.

17. The computer program product of claim 16, wherein the staleness value is a number of time units that have passed since an unsent updated state has been received.

18. The computer program product of claim 16, wherein the propagation policy specifies sending the new message if the staleness value is above a threshold, and withholding the new message if the staleness value is below a threshold.

* * * * *